May 18, 1965

J. DOLZA 3,183,731

ROTARY MOTION TRANSMITTING MECHANISM FOR
INTERNAL COMBUSTION ENGINES AND THE LIKE

Filed April 24, 1963

INVENTOR.
John Dolza
BY
Barnard, McGlynn & Reising
ATTORNEYS

INVENTOR.
John Dolza

# United States Patent Office 3,183,731
Patented May 18, 1965

3,183,731
ROTARY MOTION TRANSMITTING MECHANISM FOR INTERNAL COMBUSTION ENGINES AND THE LIKE
John Dolza, 810 State St., Fenton, Mich.
Filed Apr. 24, 1963, Ser. No. 275,286
23 Claims. (Cl. 74—219)

This invention relates to an improved mechanism for transmitting rotary motion from one rotary member to another laterally spaced rotary member. The invention has particular utility as the connection between the crankshaft and the camshaft in an internal combustion engine and will be described in detail with reference to this particular embodiment thereof; however, it will be understood that the improved mechanism can be used in many other devices, systems, and environments.

In all conventional reciprocating type internal combustion engines, the camshaft which imparts reciprocating motion in timed sequence to the intake and exhaust valves is driven by means of a gear onto the camshaft connected by a chain to a gear on the crankshaft. It is, of course, very important that the chain connection between the gears be tight since any slack in the chain leads to torsional oscillation of the camshaft, timing variations and valve mechanism noises. If slack is excessive, whipping of the chain with associated gear tooth wear can result, along with the hazard that the chain will disengage from the gears. Because of the inevitable slight variations in chain and gear sizes and in gear spacing resulting from normal manufacturing tolerances, it is difficult if not impossible to accomplish the chain tautness required without incorporating some special means or mechanism for accomplishing it. This problem of maintaining a taut chain connection between the gears is further complicated by the fact that the crankshaft and the camshaft are mounted to a common support, to wit, the engine block, and as the engine temperature fluctuates, as from a cold engine to a hot engine, the lateral spacing between the shafts undergoes variation due to metal expansion and contraction. Hence, while the chain connection might be taut when the engine is hot it would normally become slack when the engine is cool due to slight contraction of the engine block.

One obvious solution to the problem would be to use an elastic chain instead of one of fixed length such that its inherent elasticity would maintain it taut at all times. However, this is disadvantageous for the reason that an elastic chain inherently lacks various essential properties, most importantly tensile strength. The stock solution to the problem, which is in common use at the present time, is to use an idler gear or other tensioning means which biases against the chain to maintain it taut. This has two disadvantages. First, it increases the noise produced by the mechanism during engine operation, since with each additional gear-to-chain connection the noise level becomes greater. Secondly, it is expensive because it requires additional, relatively costly parts.

A fundamental objective of this invention is the provision of a mechanism for transmitting drive between a pair of rotary members mounted on generally parallel but laterally offset shafts wherein variations in the lateral distance between shafts may be accommodated without introducing torsional oscillations or variations between the rotary members. In other words, the present mechanism provides a rotary motion transmitting drive train in which there is substantially no torsional wrap-up or relative torsional movement between rotary members while permitting variations in the lateral displacement in the rotative axes of such members.

A further and specific object is the provision of an improved and simplified mechanism for transmitting rotary motion from the crankshaft to the camshaft so as to maintain proper valve timing even though the lateral distance between said shafts may vary. Still another object is the provision of an improved rotary member particular useful in rotary motion transfer mechanisms in which lateral distances between coacting rotary axes are variable.

Briefly, these objects are accomplished by constructing one or both of the gears or other rotary members with a hub, a rim, and resilient means connecting the hub and rim such that an eccentric relationship can exist between the hub and the rim. Hence, an extremely strong non-elastic chain can be used and without need for a chain biasing idler gear mechanism. The resilient connection between the hub and rim maintaining the chain taut at all times irrespective of slight variations in the spacing between the axes of rotation of the gears.

In my United States patent application No. S.N. 258,763 filed February 15, 1963 there is disclosed and claimed a rotary motion transmitting mechanism of the type described wherein the chain is maintained taut by constructing one of the gears with a hub and a rim and incorporating a resilient connection, specifically an elastomer material, between the hub and the rim whereby the hub can assume a position eccentric to the rim. Further, in United States application Serial No. 275,329, filed April 24, 1963 in the name of Sergio Angelini and assigned to me, there is covered a mechanism of the aforesaid type wherein a metal spring element is used as the resilient connection between the hub and the rim.

It is a more specific object of the present invention to provide an improved rotary motion transmitting mechanism of the type covered by the aforesaid patent applications. More specifically, this invention has as one of its objects the provision of an improved mechanism wherein the resilient connection between the hub and the rim of one of the gears or other rotary members comprises a metal spring formed to provide optimum desired compression-tension radial resiliency thereby permitting the spring biased eccentricity required between the hub and rim to maintain the chain taut, but without any undesired angular movement of the rim with respect to the hub. These and other objects, features and advantages of the invention will appear more clearly from the following detailed description thereof made with reference to the appended drawings in which:

Figure 1:
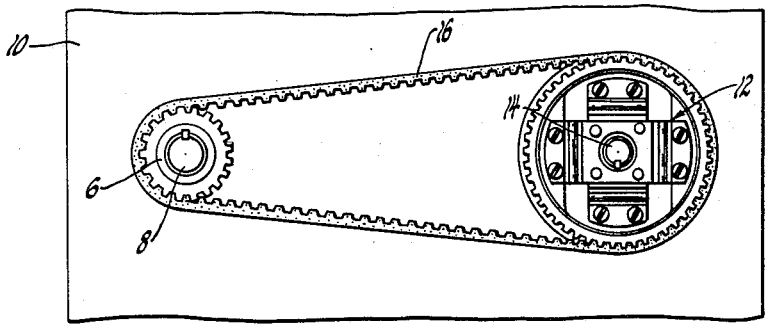
FIGURE 1 is a front view of a preferred embodiment of the invention showing a relatively small driving gear connected to the crankshaft of an engine, a large driven gear connected to the engine camshaft, and a chain connected between the two.

Referring now to FIGURE 1, the mechanism shown comprises a relatively small driving gear 6 secured to the end of crankshaft 8 which is rotatably supported by the metal engine block indicated at 10, a relatively large driven gear 12 secured to the end of the camshaft 14 which extends parallel to the crankshaft and which is also rotatably supported by the metal engine block 10, and a taut strong continuous chain 16 engaging and interconnecting the driving and driven gears to transmit the rotary motion of the one to the other. Since the chain can be of substantially fixed length, requiring low elasticity, its construction should preferably be such as to provide optimum tensile strength. In the embodiment shown, the chain is formed of a cloth-organic polymer laminated material with the teeth molded therein and with imbedded continuous strands of metal wire or glass fiber to impart the high tensile strength. Such a chain has the advantage of being relatively noiseless as compared to a metal link chain.

In accordance with the invention, the driven gear 12 comprises a hub 18 (see FIGURES 3 and 4) which is keyed to the camshaft 14 and a rim 20 which has its outer periphery formed with gear teeth in engagement with the chain 16 and which is secured to the hub by a metal spring element 22. The spring element comprises two strips of spring steel riveted crosswise to each other such that the riveted asembly has a flat rectangular shaped center portion 24 and four generally radially projecting equally spaced flat spring legs 26, 28, 30 and 32.

Figure 3:
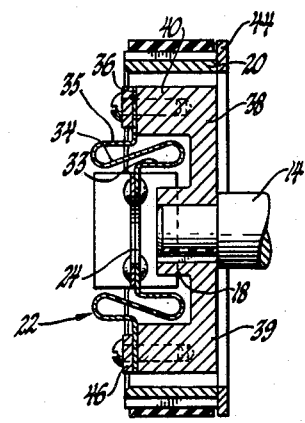
FIGURE 3 is a sectional view of the driven gear taken on the line 3—3 of FIGURE 2.
Figure 4:
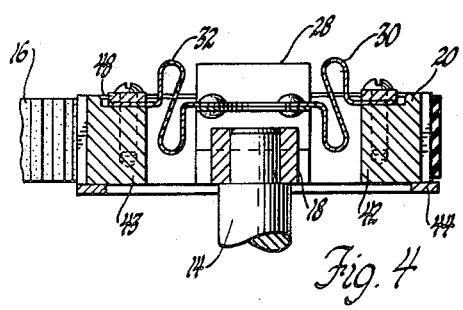
FIGURE 4 is a sectional view of the driven gear taken on the line 4—4 of FIGURE 2.
Figure 5:
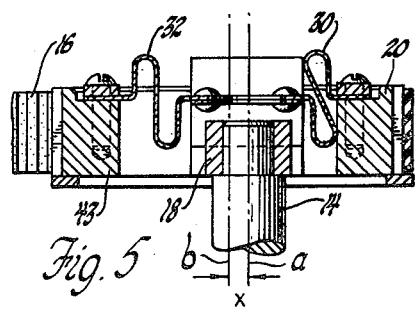
FIGURE 5 is a view similar to that of FIGURE 4, but showing the gear components in different relative positions and illustrative of the operation of the invention.
Figure 6:
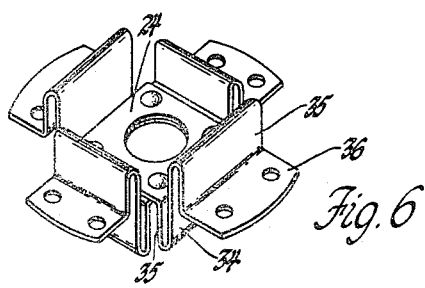
FIGURE 6 is a perspective view of the spring element incorporated in the FIGURE 1–5 embodiment.

Referring to FIGURES 3 and 5, each leg has two reverse bends connecting three flat portions 33, 34 and 35 which are disposed at varying angles, infra, to the plane of spring center portion 24 and to the radial axis of the leg. Flat portion 34 is about twice as long in the direction of the axis of rotation as flat portions 33 and 35 and the latter terminates with a radially outwardly bent flange 36 which lies in the plane of spring center portion 24.

Hub 18 has two radially outwardly extending diametrically opposed flanges 38 and 39 terminating with a raised portion as shown at 40. As can best be seen in FIGURES 2 and 4, the rim comprises an outer gear-toothed cylindrical portion having a pair of diametrically opposed radially inwardly extending flanges 42 and 43, these flanges being oriented at 90 degrees to the flanges 38 and 39 on the hub and having surfaces about coplanar with the raised portions 24. A flat metal ring 44 having an external diameter somewhat greater than that of the gear-toothed portion is welded concentrically to the latter and hence provides an outwardly extending circumferential flange on one side of the rim to assist in maintaining the chain or belt on the rim. The two flat spring legs 26 and 28 are secured to the raised portions of hub flanges 38 and 39 respectively by means of bolts as shown, a metal retainer 46 being interposed between the bolt heads and the spring leg to provide a more firm attachment. Similarly, spring legs 30 and 32 are bolted to the radially inwardly extending flanges 42 and 43, respectively, on the rim, metal retainers 48 also being used here to provide a strong attachment.

Figure 7:
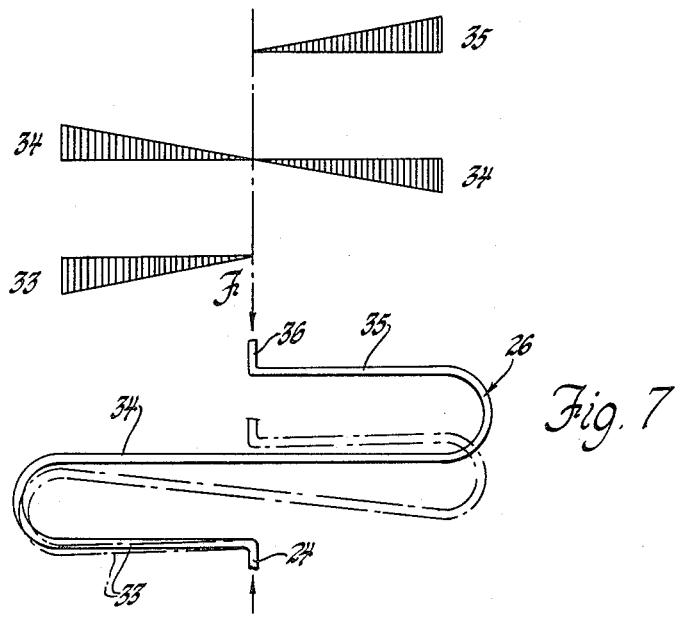
FIGURE 7 is a diagrammatic view showing the bending moments acting on each spring.

To understand the purpose and function of the double reversely bent spring legs 26, 28, 30 and 32, reference is now made to FIGURE 7. For illustrative purposes spring leg 26 will be analyzed from the point of view of the bending moments acting thereon. It being understood that the analysis applies in the same manner to the remaining legs. The bending moment diagrams indicate, from top to bottom, the loading of spring portions 35, 34 and 33. The zero (0) axis through the spring is in the plane which includes spring portion or tabs 36, through which the spring is secured to hub flange 38, and center portion 24 at which the spring strips are secured together. The zero (0) axis is also the line along which there is a zero bending moment.

Since there is no bending moment at points 36 and 24, where the spring is anchored, these points are practically stress free resulting in a spring which is more reliable from the point of stress concentration.

As hub and rim 18 and 20 are moved into eccentricity, a force F is applied to spring portion 35 causing a bending moment varying from zero at the point of application to a maximum at the other end of the portion. Spring portion 34 goes from this maximum bending moment at the right end to opposite but equal maximum at the left end passing through zero moment at the zero axis. Spring portion 33 goes again from a maximum bending moment to a zero moment at the zero axis where the central portions 24 of the springs are secured together.

Furthermore, the double reversely bent spring leg construction has essentially twice the developed length of the spring leg shown in copending application Serial No. 275,329 Angelini making it possible to achieve a lower rate for a maximum given stress and eccentricity producing force. In other words, the unit spring stress is about one half with the present construction.

Figure 8:
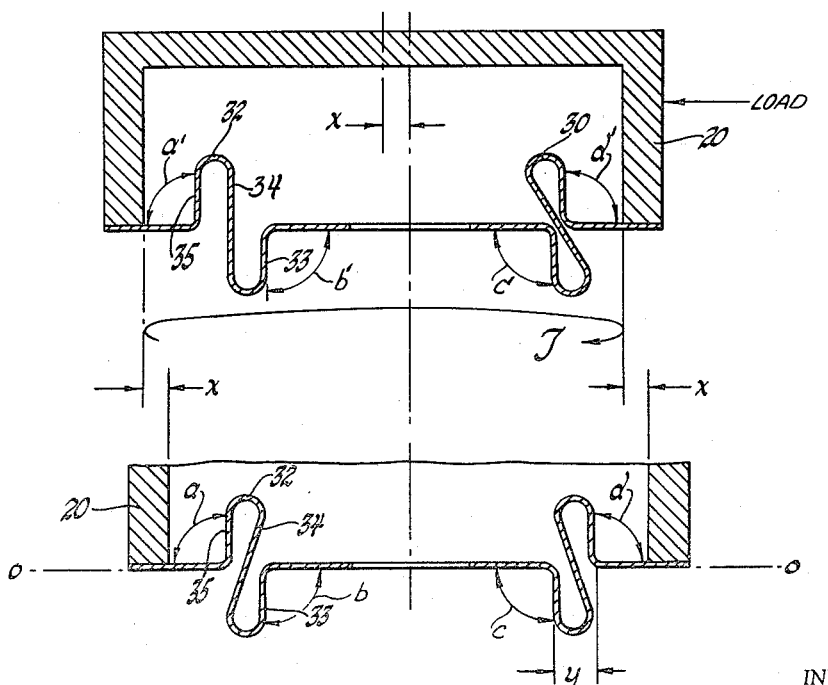
FIGURE 8 is a diagrammatic view showing the spring in a loaded and unloaded condition.

Referring now to FIGURE 8 spring 30–32 is shown diagrammatically connected to rim 20 and in a "load" and "no load" condition. Referring to the drawing letters:

$x$ = eccentricity between hub and rim
angle $a$ = angle $b$
angle $c$ = angle $d$
angle $a'$ = angle $b'$
angle $c'$ = angle $d'$ These angles are measured at the tangents of the radii as shown in FIGURE 8.

In the "no load" condition, leg portion 34 is inclined to the zero bending moment axis so as to minimize the distance $y$. Distance $y$ comprises the sum of the working eccentricity of member 12, spring thickness, manufacturing variations and a small safety clearance. The purpose of minimizing distance $y$ is because there is a torque reaction force T caused by the driving rotation of member 12. This force T acts through distance $y$ creating a moment T.$y$ tending to cause relative rotation between the hub and rim. Minimizing the torsional moment T.$y$ reduces the tendency toward relative rotation of rim and hub attributable to spring flexure.

Thus, by reason of the particular shape of the spring legs, excellent radial compression-tension resiliency is attained. As indicated in FIGURE 5 the hub is normally in an eccentric position with respect to the rim hub due to flexing of the flat spring legs. The camshaft 14 can move away from the crankshaft 8, by an amount indicated at X the rim remaining in its same position with respect to the crankshaft through the use of a taut chain of substantially fixed length.

Figure 2:
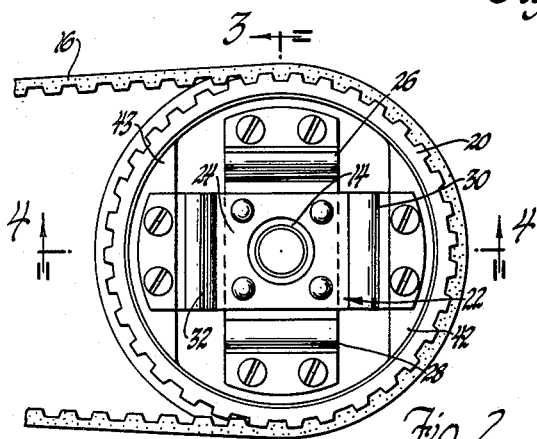
FIGURE 2 is an enlarged view of the driven gear in the FIGURE 1 embodiment.

When the angular orientation of the gear is as shown in FIGURE 2, any eccentricity demanded is by way of the flexing of legs 30 and 32, and when the gear rotates 90° from the position shown in FIGURE 2, any eccentricity is by way of the flexing of legs 26 and 28. When the gear is in intermediate angular positions, all four spring legs flex slightly to provide the eccentricity. It will be noted however that whereas the spring legs allow for spring biased eccentricity between the hub and the rim, there can be only very small angular movement of the hub with respect to the rim in the plane of the gear, and hence essentially no wind-up of the hub with respect to the rim. Neither can there be any substantial angular movement of the hub out of the plane of the rim.

As assembled, the rotative axis $a$ of hub 18 is offset from the rotative axis $b$ of rim 20 an initial amount $x$. The minimum $x$ is determined by pretensioning the chain to at least the maximum tangential pulsating force introduced into the chain by engine operation or to the tension required to produce the minimum desired belt or chain vibration frequency. For instance, and with a particular engine, fifty pounds of pre-load between members 6 and 12 will equal or exceed slightly the maximum tangential force required to overcome the peak torque reaction of the cam on the camshaft 14. Unless such pretensioning of member 12 is undertaken, the pulsating tangential force which is variously introduced into chain 16, would start member 12 "bouncing."

The axis offset $x$ of rim 20 is in the opposite direction of thermal expansion as block 10 becomes heated. In other words, as the engine heats, camshaft 14 moves away from crankshaft 18 and the distance $x$ will become larger increasing the eccentricity. At the same time, due to the essential non-elasticity of belt or chain 16, rim 20 will remain in its same spatial relationship with respect to drive gear 6. The initial and controlled eccentricity insures that the direction of eccentricity is always the same even though the magnitude may vary. This relationship further enhances stability of the drive system including its ability to transmit drive between members 6 and 12 without torsional oscillations.

The spring construction shown provides excellent assurance against spring failure since with the plurality of reverse bends, good flexing is attained without undue stress on any one portion of the spring legs. Also, by forming the spring of two metal strips secured crosswise as shown, each leg of the spring can have optimum metallurgical properties contributing to good flexibility and strength since in forming each strip, the grain structure can be oriented lengthwise as is desirable.

It will be understood that while the invention has been described in detail specifically with reference to a preferred embodiment thereof various changes and modifications may be made all within the full and intended scope of the claims which follow.

I claim:

1. A rotary motion transmitting mechanism comprising a first rotary member, a second rotary member with its axis of rotation spaced from that of the first rotary member, and means interconnecting said rotary members to transmit the rotary motion of the one to the other, at least one of said rotary members having a hub, a rim, and a plurality of generally radially projecting flat springs connecting the hub to the rim, each of said springs having at least one reverse bend joining two substantially flat spring portions which extend in planes at an angle to the radial axis of the spring, said springs permitting eccentricity between the hub and the rim while inhibiting angular movement of the hub with respect to the rim.

2. A rotary motion transmitting mechanism as set forth in claim 1 wherein there are two members secured together so as to provide four spring portions each disposed at 90° to the adjacent spring portions.

3. A rotary motion transmitting mechanism as set forth in claim 1 wherein at least one of the spring portions joined by the reverse bend extends in a plane substantially normal to the radial axis of the spring.

4. A rotary motion transmitting mechanism as set forth in claim 1 wherein each spring has two reverse bends.

5. A rotary motion transmitting mechanism comprising a first rotary member, a second rotary member with its axis of rotation spaced from that of the first rotary member, and means interconnecting said rotary members to transmit the rotary motion of the one to the other, at least one of said rotary members having a hub, a rim, and a metal spring with a center portion and a plurality of generally radial legs projecting from the center portion each leg having at least a reverse bend joining substantially flat portions intermediate the free end of the leg and said center portion and extending in planes which are at an angle to the radial axis of the leg, the free ends of said legs being alternately secured to said hub and said rim to thereby permit spring biased eccentricity between the hub and the rim while inhibiting angular movement of the hub with respect to the rim.

6. A rotary motion transmitting mechanism as set forth in claim 5 wherein said spring is formed by spring metal strips secured crosswise to each other.

7. A rotary motion transmitting mechanism as set forth in claim 3 wherein the substantially flat portions of each spring leg are about normal to the radial axis of the spring.

8. A rotary motion transmitting mechanism comprising a first rotary member, a second rotary member with its axis of rotation spaced from that of the first rotary member, and means interconnecting said rotary members to transmit the rotary motion of the one to the other, at least one of said rotary members having a hub with a pair of diametrically opposed radially outwardly extending flanges, a rim with a pair of diametrically opposed radially inwardly extending flanges, and a spring formed of flat sheet metal having a center portion and four equally spaced legs projecting generally radially outwardly from the center portion, each leg having two reverse bends joining portions extending in planes substantially normal to the radial axis of the leg, the free ends of said legs being alternately secured to the flanges on said hub and the flanges on said rim to thereby permit eccentricity between the hub and the rim while inhibiting angular movement of the hub with respect to the rim.

9. A rotary motion transmitting mechanism as set forth in claim 8 wherein the means interconnecting said rotary members in a closed flexible loop of substantially fixed length.

10. A rotary motion transmitting mechanism comprising a first rotary member connected to a shaft, a second rotary member connected to a second shaft parallel to and spaced from said first mentioned shaft, both of said shafts being rotatably supported by a common support which is subject to expansion due to temperature fluctuations, and means interconnecting said rotary members to transmit the rotary motion of the one to the other, said means preventing any increase in the spacing between the outer peripheries of said rotating members, at least one of said rotary members having a hub, a rim, and a plurality of generally radially projecting flat spring legs connecting the hub to the rim, each of said spring legs having at least one reverse bend joining portions which extend in planes which are at an angle to the radial axis of the leg to thereby permit eccentricity between the hub and the rim and allow for variation in the spacing between the shafts due to expansion of the support.

11. A rotary member comprising a hub, a rim, and a plurality of generally radially projecting flat springs connecting the hub to the rim, each of said springs having at least one reverse bend joining portions which extend in planes at an angle to the radial axis of the spring, said springs permitting eccentricity between the hub and the rim while inhibiting angular movement of the hub with respect to the rim.

12. A rotary member as set forth in claim 11 wherein the flat springs project from a spring center portion, the ends of said laminar springs being alternately joined to the hub and the rim.

13. A rotary member as set forth in claim 11 wherein each springs has two reverse bends.

14. A rotary member as set forth in claim 11 wherein at least one of the portions joined by the reverse bend extends in a plane substantially normal to the radial axis of the spring.

15. A rotary member as set forth in claim 11 wherein there are two members secured together so as to provide four spring portions each being disposed 90° from the adjacent spring portions.

16. A rotary member as set forth in claim 11 wherein each spring has two reverse bends connecting an intermediate portion and two end portions all extending at an angle to the radial axis of the spring, the intermediate portion being larger than either of the two end portions.

17. A rotary member as set forth in claim 11 wherein each flat spring includes a generally flat central portion and a flange portion radially spaced from said central portion, the angularly extending portions of each spring being radially intermediate said central portion and said flange portion, said central and flange portions of each spring being coplanar.

18. A rotary member as set forth in claim 17 in which relative radial movement between the hub and rim introduces bending moments in the angularly extending spring portions and which moments vary progressively in magnitude along the lengths of said portions, each of said springs including a radial axis of zero bending moment.

19. A rotary member as set forth in claim 18 in which the zero bending moment axes are coplanar with the central and flange portions of each spring.

20. A rotary member as set forth in claim 19 which includes first means alternately connecting the spring flange portions to the hub and the rim and second means securing together the central portions of said springs.

21. An internal combustion engine having a crankshaft, a camshaft spaced from and generally parallel to the crankshaft, a gear connected to the crankshaft, a gear connected to the camshaft and a continuous chain of substantially fixed length interconnecting said gears to transmit the rotary motion of the one to the other, at least one of said gears having a hub, a rim, and a plurality of generally radially projecting flat springs connecting the hub to the rim, each of said springs having at least one reverse bend joining portions which extend in planes at an angle to the radial axes of the spring to permit eccentricity between the hub and the rim and thereby allow for any variation in the spacing between the drive shaft and the camshaft.

22. A rotary member comprising a hub having a rotative axis, a rim having a rotative axis, and a plurality of generally radially projecting flat springs connecting the hub to the rim, each of said springs having at least one reverse bend joining portions which extend in planes at an angle to the radial axis of the spring, said springs permitting radial eccentricity between the hub and the rim while inhibiting angular movement of the hub with respect to the rim, said rotative axes remaining substantially parallel during any such eccentricity.

23. A motion transmitting device comprising first and second rotatable shafts being laterally offset from and parallel to each other, a pair of pulley members respectively fixed for rotation with said first and second shafts, and a continuous belt of substantially fixed length interconnecting said pulleys to transmit rotary motion between said shafts, at least one of said pulley members having a hub fixed to the associated shaft, a rim, and a plurality of generally radially projecting flat springs connecting the hub to the rim, each of said springs having at least one reverse bend joining portions which extend in planes at an angle to the radial axes of the spring to permit eccentricity between the hub and the rim to allow for any variation in the spacing between the shafts, said belt length being such as to pre-tension said springs and impart an initial eccentricity to said rim relative to said hub.

References Cited by the Examiner

UNITED STATES PATENTS

| | | | |
|---|---|---|---|
| 1,043,012 | 10/12 | Hudson | 74—443 |
| 2,475,010 | 7/49 | Chilton. | |
| 2,615,316 | 10/52 | Kirwin | 74—230.01 X |

FOREIGN PATENTS

| | | |
|---|---|---|
| 907,481 | 3/54 | Germany. |
| 117,574 | 11/46 | Sweden. |

DON A. WAITE, *Primary Examiner.*